United States Patent
Hwang et al.

(10) Patent No.: US 8,269,157 B2
(45) Date of Patent: Sep. 18, 2012

(54) OPTICAL IMAGING SYSTEM

(75) Inventors: Ing-Shouh Hwang, Taipei (TW); En-Te Hwu, Taipei (TW); Shao-Kang Hung, Taipei (TW)

(73) Assignee: Academia Sinica, Taipei (TW)

( * ) Notice: Subject to any disclaimer, the term of this patent is extended or adjusted under 35 U.S.C. 154(b) by 301 days.

(21) Appl. No.: 12/604,711

(22) Filed: Oct. 23, 2009

(65) Prior Publication Data

US 2011/0095210 A1   Apr. 28, 2011

(51) Int. Cl.
*G02B 27/40* (2006.01)
*G11B 7/00* (2006.01)

(52) U.S. Cl. .................. 250/201.5; 250/201.4; 250/221; 369/44.23; 369/112.23

(58) Field of Classification Search .................. 250/205, 250/201.5, 201.4, 216, 221, 578.1; 369/112.01, 369/112.23, 120, 121, 44.23
See application file for complete search history.

(56) References Cited

U.S. PATENT DOCUMENTS

| 5,237,238 | A | 8/1993 | Breghaus et al. |
| 7,247,827 | B1 | 7/2007 | Hwang et al. |
| 2009/0153839 | A1* | 6/2009 | Kay ................ 356/51 |

OTHER PUBLICATIONS

E.-T. Hwu, S,-K. Hung, C.-W. Yang, Kuang-Yuh Huang, and I.-S. Hwang, "Real-time detection of linear and angular displacements with a modified DVD optical head," Nanotechnology (SCI), vol. 19, No. 115501. (2008).

E.-T. Hwu, S,-K. Hung, C.-W. Yang, Kuang-Yuh Huang, and I.-S. Hwang, "Simultaneous detection of translational and angular displacements of micromachined elements," Applied Physics Letters (SCI), vol. 91, No. 221908. (2007).

En-Te Hwu, Kuang-Yuh Huang, Shao-Kang Hung, and Ing-Shouh Hwang, "Measurement of the Cantilever Displacement Using a CD/DVD Pickup Head," Japanese Journal of Applied Physics (SCI), vol. 45, No. 3B, pp. 2368-2371 (2005).

* cited by examiner

*Primary Examiner* — Kevin Pyo
(74) *Attorney, Agent, or Firm* — Occhiuti Rohlicek & Tsao LLP (57) ABSTRACT

A system includes an objective lens, an imaging module, and a measurement module. The objective lens is configured to receive light emitted by a light source, focus the emitted light onto a target object, and receive light reflected by the target object. The imaging module is configured to receive a first portion of the reflected light. The measurement module is configured to receive a second portion of the reflected light and includes a photo detector and an astigmatic lens configured to direct the second beam onto the photo detector.

15 Claims, 8 Drawing Sheets

OPTICAL IMAGING SYSTEM

CROSS-REFERENCE TO RELATED APPLICATIONS

This application is related to U.S. Pat. No. 7,247,827, filed May 31, 2006, and issued Jul. 24, 2007, and entitled "System for Measurement of the Height, Angle, and Their Variations of the Surface of an Object;" and to Taiwanese patent No. I 264520, issued Oct. 21, 2006, the contents of both of which are incorporated herein by reference.

This application is also related to co-pending U.S. application Ser. No. 12/604,722, filed Oct. 19, 2009, and entitled "Alignment and Anti-Drift Mechanism," the contents of which are incorporated herein by reference.

FIELD OF THE INVENTION

This invention relates to an optical imaging system.

BACKGROUND

Microfabricated elements, such as micro-mirrors, read/write heads of hard disk drives, acceleration sensors, and electro-acoustic high frequency elements, are widely used in a variety of microelectrical-mechanical systems (MEMS) applications. Measurement of the static or dynamic mechanical motion of these microfabricated elements provides information useful for the design, development, and simulation of such devices.

Mechanical motion and displacements of MEMS devices are characterized using techniques such as laser interferometry, laser Doppler velocimetry, stroboscopic interferometry, and an astigmatic detection method. An astigmatic detection system (ADS) measures translational displacement of a target object along one axis and angular displacement of the object around two axes. An ADS includes an optical path mechanism in which a detection laser beam passes through a lens assembly and is focused on the surface of the object. The object reflects the light back through the lens assembly and to a position sensitive photosensor. The shape and position of a light spot formed on the photosensor is used to analyze the translational and angular displacement of the object. To position the detection laser beam at a desired position on the surface of the object, the object is observed through an external microscope that includes an eyepiece or other imaging device, such as a CCD sensor.

SUMMARY

In a general aspect, a system includes an objective lens, an imaging module, and a measurement module. The objective lens is configured to receive light emitted by a light source, focus the emitted light onto a target object, and receive light reflected by the target object. The imaging module is configured to receive a first portion of the reflected light. The measurement module is configured to receive a second portion of the reflected light and includes a photo detector and an astigmatic lens configured to direct the second beam onto the photo detector.

Embodiments may include one or more of the following. The system further includes an objective beam splitter configured to receive the reflected light from the objective lens and to divide the reflected light into the first portion and the second portion. The objective beam splitter is further configured to receive the emitted light and to reflect the emitted light into the objective lens. The system further includes a source beam splitter configured to receive light emitted by the light source and to reflect the emitted light toward the objective lens and to receive the second portion of the reflected light from the objective beam splitter and to transmit the second portion of the reflected light to the astigmatic lens.

The astigmatic lens is further configured to receive the emitted light and to reflect the emitted light toward the objective lens. The photo detector includes a position sensitive detector, which may be a four quadrant position sensitive detector. The system further includes the light source, which may be a laser.

The system further includes an illumination light source configured to provide light to the objective lens for illumination of a region of the target object. The light provided by the illumination light source is scattered by the target object. The system further includes an objective beam splitter configured to receive the reflected light and the scattered light from the objective lens and to divide the received light into the first portion and the second portion.

The imaging module includes an imaging sensor, such as a CCD camera. The imaging module further includes a relay lens configured to receive the first portion of the reflected light and to transmit the first portion of the reflected light to the imaging sensor. The astigmatic lens is a cylindrical lens or an inclined planar light refraction layer.

An optical imaging system as described herein has a number of advantages. An objective lens shared between the optical imaging system and a measurement system enables simultaneous imaging of a target object and measurement of the translational and/or angular displacements of the object. A detection light spot that is focused on the surface of the object for measurement purposes can be visualized through the optical imaging system and positioned at a desired location on the object surface. Thus, static and dynamic displacements can be measured for specific features of the object. Furthermore, an instrument that integrates optical imaging and measurement is compact and makes efficient use of a minimal number of optical elements.

DETAILED DESCRIPTION

Figure 1A:
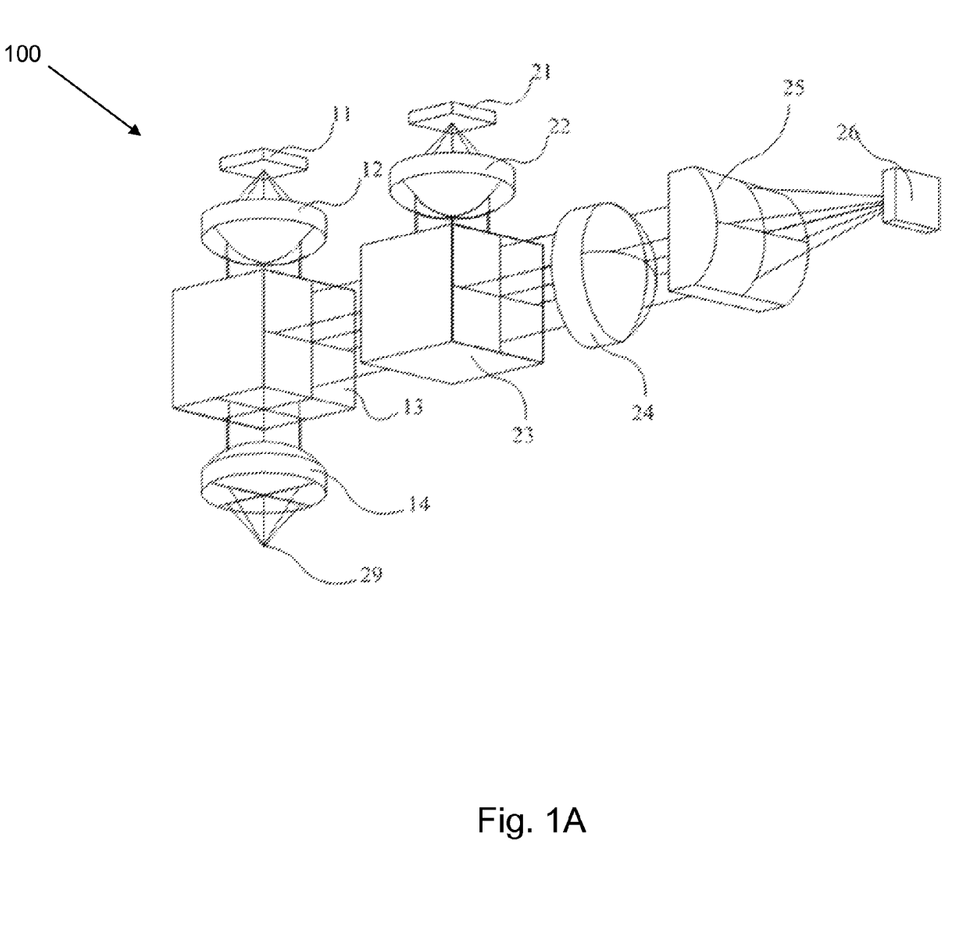
FIGS. 1A and 1B are diagrams of a first embodiment of an optical path mechanism used with an astigmatic detection system (ADS).
Figure 1B:
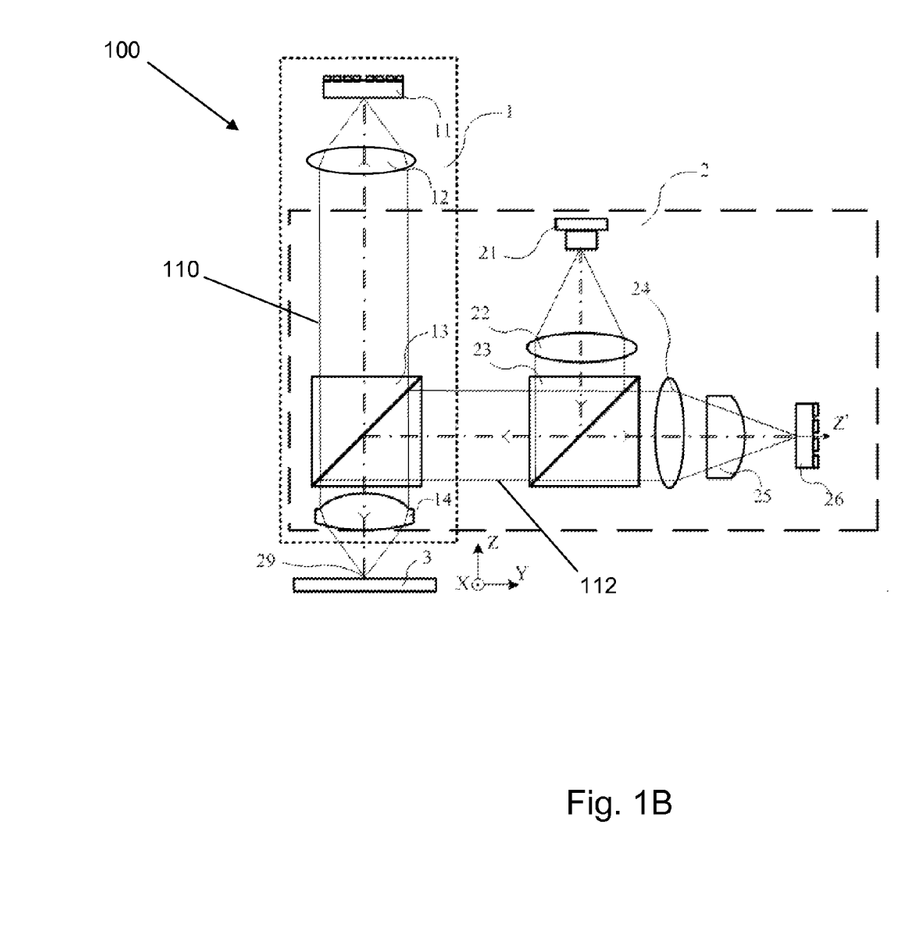

Referring to FIGS. 1A and 1B, an optical path mechanism 100 combines an optical imaging system 1 with an astigmatic detection system (ADS) 2. A light source 21, such as a laser or a laser diode, generates a light beam that is formed into a parallel light beam by a collimator lens 22. The light beam is reflected by an ADS beam splitter 23 and an objective beam splitter 13 toward an objective lens 14. Objective lens 14 focuses the light beam onto a detection light spot 29 on the surface of an object 3. Objective lens 14 and objective beam splitter 13 are shared by optical imaging system 1 and ADS 2.

Object 3 reflects the incident light back through objective lens 14 and to objective beam splitter 13, which divides the light into an imaging beam 110 and a measurement light beam 112. Imaging light beam 110 is transmitted through objective beam splitter 13 and is focused on an image sensor 11 in optical imaging system 1 by a sensor lens 12. Measurement light beam 112 is reflected by objective beam splitter 13 and is transmitted through ADS beam splitter 23, a detector lens 24, and an astigmatic lens 25, such as a cylindrical lens or an inclined planar light refraction layer, in ADS 2.

Figure 1C:
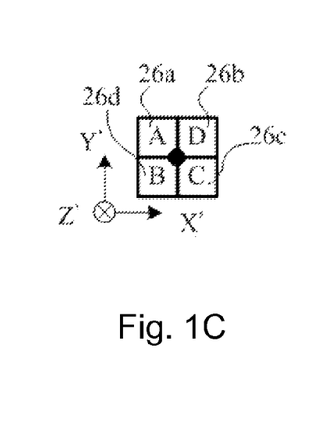
FIG. 1C is a diagram of a position sensitive detector.

Referring to FIGS. 1A-1C, detector lens 24 focuses the measurement beam. The focused beam passes through astigmatic lens 25, which breaks the rotational symmetry of the beam such that rays propagating in two perpendicular planes have different foci. The beam then strikes a position sensitive detector (PSD) assembly 26 for the measurement of the height, tilt angle, and/or variations thereof of the surface of object 3. PSD assembly 26 is composed of four quadrants 26a, 26b, 26c, and 26d, each housing a photo sensor that outputs a measurement signal. Translational and angular displacements of object 3 are determined based on the shape and position of the light spot focused on PSD assembly 26. The algorithms for processing the measurement signals from the four photo sensors of PSD assembly 26 to obtain the displacement of object 3 are described in U.S. Pat. No. 7,247,827, the contents of which are incorporated herein by reference.

In some embodiments, an external light source is used to illuminate the top surface of object 3 from above or, in the case of a transparent object, from below. Light scattered by the surface of object 3 is collected by objective lens 14 and directed through the optics of optical imaging system 1, forming an image on image sensor 11. Image sensor 11 thus receives images of both the surface of object 3 and the detection light spot 29 on the surface of object 3. With an actuator attached to either object 3 or objective lens 14, the detection light spot 29 can be positioned at a desired location on the surface of object 3. The actuator may be any device capable of adjusting the relative position of objective lens 14 and object 3, such as a piezoelectric material, a voice coil motor, or a translational or rotary stage.

Figure 2:
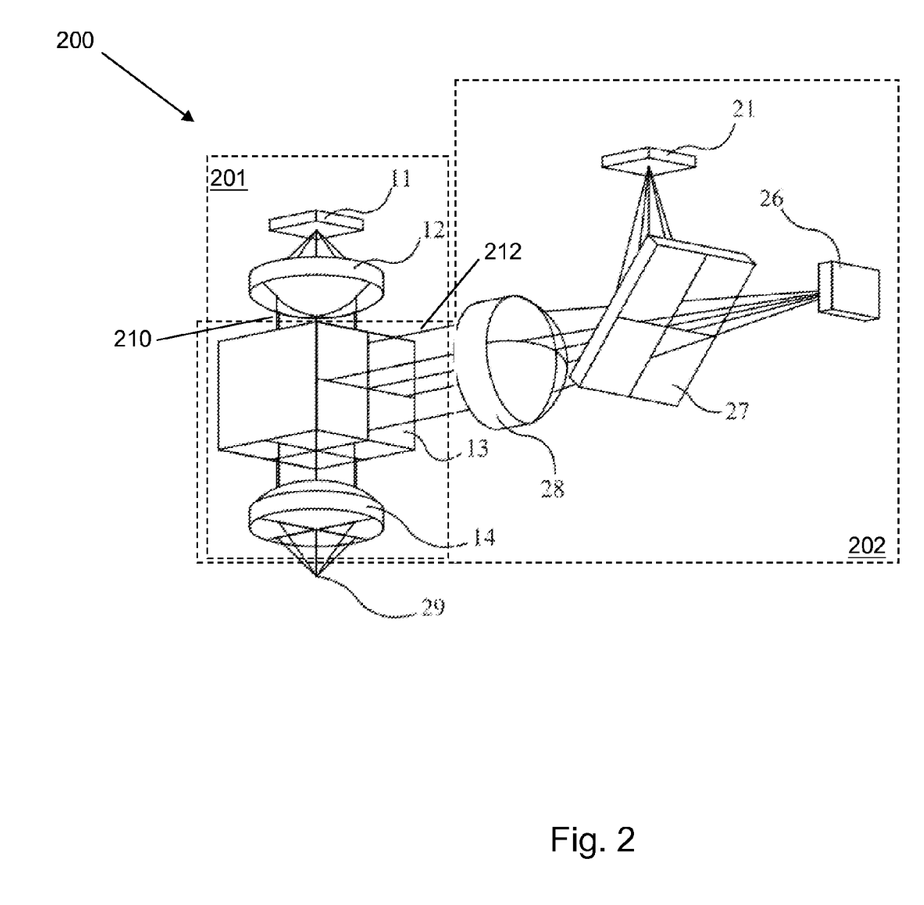
FIG. 2 is a diagram of a second embodiment of an optical path mechanism used with an ADS.

Referring to FIG. 2, a second embodiment of an optical path mechanism 200 combines an optical imaging system 201 and an ADS 202. In this embodiment, a light source 21 generates a light beam that is reflected by an inclined glass plate 27 through a collimator lens 28, which forms the beam into a parallel beam. The parallel beam is reflected by objective beam splitter 13 through objective lens 14. Objective lens 14 focuses the light beam on the surface of object 3, forming detection light spot 29. As in the embodiment described above, objective lens 14 and objective beam splitter 13 are shared by optical imaging system 201 and ADS 202.

Object 3 reflects the incident light back through objective lens 14 and to objective beam splitter 13, which divides the reflected light into an imaging light beam 210 and a measurement light beam 212. Imaging light beam 210 is transmitted through objective beam splitter 13 and is focused on image sensor 11 by sensor lens 12, forming an image spot on image sensor 11. Measurement light beam 212 is reflected by objective beam splitter 13 toward collimator lens 28 and glass plate 27, which behaves as an astigmatic lens. Collimator lens 28 focuses the measurement beam. The focused beam passes through glass plate 27, which breaks the rotational symmetry of the beam such that rays propagating in two perpendicular planes have different foci. The beam then strikes PSD assembly 26 for measurement of displacements of object 3 at the position of detection light spot 29. In this embodiment, the dual function of inclined glass plate 27 as a reflector of emitted light toward the objective lens and as an astigmatic lens saves one optical component compared to the embodiment shown in FIG. 1.

As described above, the top surface of sample 3 may be illuminated by an external light source. Light scattered by the surface of object 3 forms an image on image sensor 11. Image sensor 11 thus receives images of both the surface of object 3 and the detection light spot 29 on the surface of object 3. With an actuator attached to either object 3 or objective lens 14, the detection light spot 29 can be positioned at a desired location on the surface of object 3. The actuator can also move along the axis of the beam in order to adjust the focal plane to a desired position on object 3.

Figure 3:
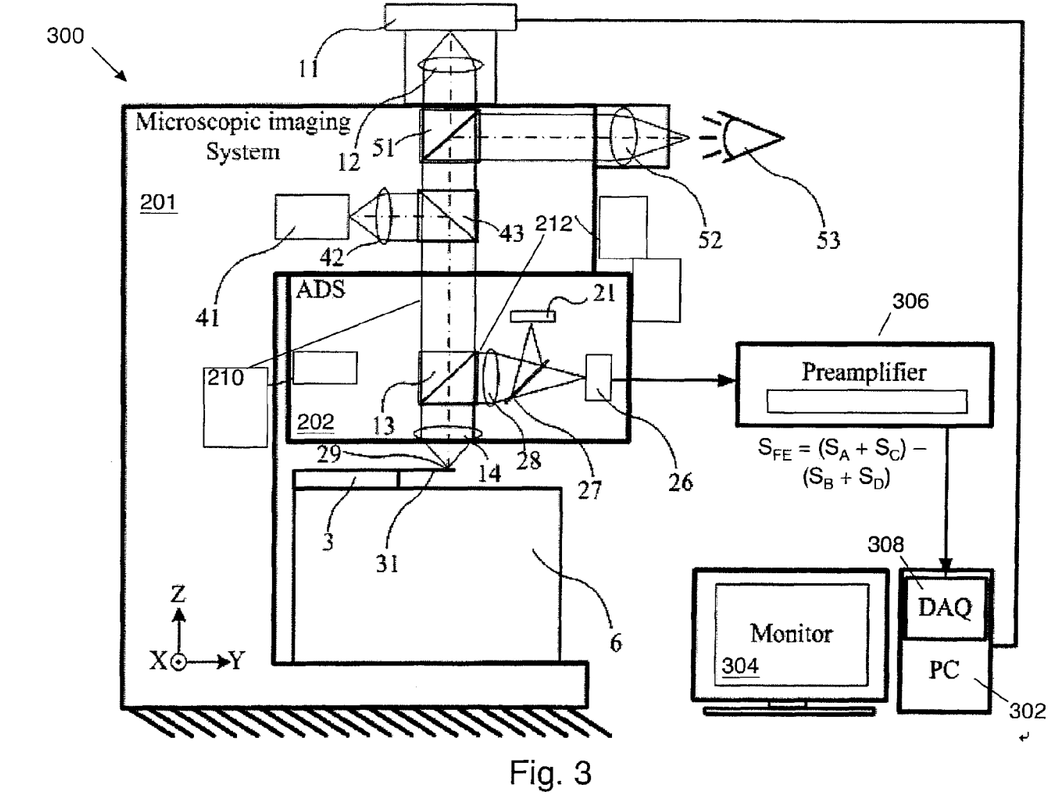
FIG. 3 is a diagram of a measurement system employing the optical path mechanism of FIG. 2.

Referring to FIG. 3, optical path mechanism 200, including imaging system 201 and ADS 202, as shown in FIG. 2, is used in a measurement system 300 for the simultaneous imaging of a microfabricated cantilever 31 and measurement of translational and angular displacements of the cantilever. In some embodiments, imaging system 201 is implemented as a commercial optical microscope. In this example, object 3, which includes cantilever 31, rests on a coarse XYZ linear stage 6. Light source 21 produces a detection beam that is reflected by astigmatic lens 27, transmitted through collimator lens 28, and is reflected toward objective lens 14 by objective beam splitter 13, as described above. Objective lens 14 focuses the beam into detection light spot 29 on cantilever 31. An external light source 41 used to illuminate the surface of cantilever 31 generates an illumination beam which is collimated by a convex lens 42 and directed by an illumination beam splitter 43 through objective beam splitter 13 and objective lens 14 and to cantilever 31.

In this example, objective lens 14 has a numerical aperture (N.A.) of 0.6 and a focal length of 2.33 mm. The full-width at half-maximum (FWHM) of detection spot 29 is given by $$D_W = \frac{k \cdot \lambda}{N.A.},$$

where $\lambda$ is the wavelength of the laser beam and k is a constant equal to 0.52. For a laser diode light source 21 with a wavelength of 655 nm, the smallest detection spot 29 has a diameter of 560 nm (FWHM), which is close to the diffraction limit of light.

The detection light spot 29 is reflected by cantilever 31 and the illumination light from external light source 41 is scattered by the surface of the cantilever. The reflected and scattered light from cantilever 31 passes through objective lens 14 and is transmitted through or reflected by objective beam splitter 13 as described above in conjunction with FIG. 2.

The imaging light beam 210 (i.e., the beam transmitted through objective beam splitter 13) is transmitted through illumination beam splitter 43 and arrives at an imaging beam splitter 51. Imaging beam splitter 51 divides the imaging beam into a first beam and a second beam. The first beam is sent through sensor lens 12 to imaging sensor 11, (e.g., a CCD sensor). CCD sensor 11 captures optical and/or video images of the surface of cantilever 31 and of the detection light spot 29 and transfers the images to a computer 302 for display on a monitor 304. The second beam is reflected by imaging beam splitter 51 through a sensor lens 52 and to an eye 53 of a user for viewing the measurement system. The relative position of detection spot 29 and cantilever 31 is visible in the images received at CCD sensor 11 and by an eye 53.

Figure 4:
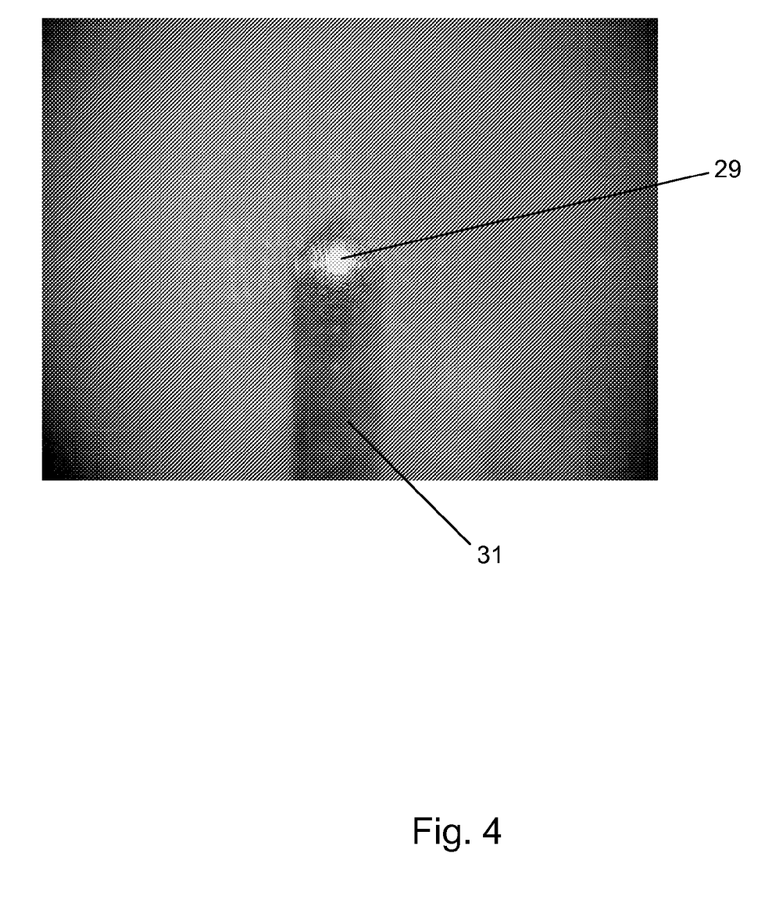
FIG. 4 is an optical image of a light spot on a microfabricated cantilever obtained using the measurement system shown in FIG. 3.

Referring to FIGS. 3 and 4, an optical image captured by CCD sensor 11 shows microfabricated cantilever 31 with detection light spot 29 focused thereon. The detection light spot 29 can be moved to a desired position on the cantilever by adjusting the position of stage 6. In some embodiments, stage 6 is fixed and the detection light spot 29 is moved by adjusting the position of objective lens 14.

Referring again to FIG. 3, the measurement light beam 212 (i.e., the beam reflected through objective beam splitter 13) passes through the optical elements of ADS 2 as described above and arrives at PSD assembly 26. PSD assembly 26 outputs a signal containing information about the translational and angular displacements of the cantilever 31. Signals generated in PSD assembly 26 pass through a preamplifier 306 and are processed and in computer 302 equipped with a high-speed data acquisition card (DAQ) 308, such as a NuDAQ PCI-9820 ADLINK card with a bandwidth of 130 MHz and a 14-Bit resolution. The high-speed DAQ 308 is useful for the measurement of thermal noise spectra of microcantilever 31. The output signal of ADS 2 has a linear region of about 6 µm, which is sufficient to detect the movement of microfabricated elements such as cantilever 31. The maximum measurable angular range of the ADS is ±8° and the noise level of the system is 10 pm (RMS). ADS 2 is capable of measuring the static and dynamic displacement of reflective or transparent objects.

Figure 5:
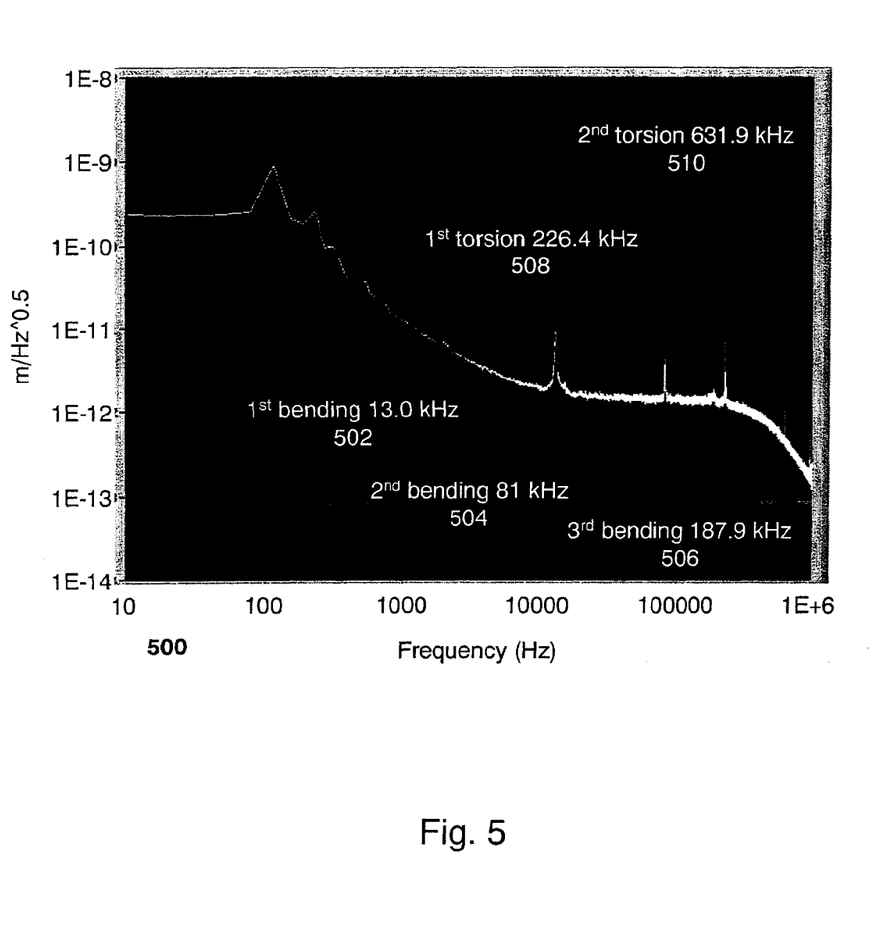
FIG. 5 is a thermal noise spectrum of the microfabricated cantilever shown in FIG. 4.

Referring to FIGS. 3 and 5, a thermal noise spectrum 500 of cantilever 31 is measured by ADS 2. The thickness, width, and length of the cantilever are 2 µm, 50 µm, and 450 µm, respectively. According to the specifications of the cantilever, the fundamental resonance frequency of the first bending mode of the cantilever is between 9-16 kHz. Noise spectrum 500 reveals a first bending mode 502 at 13.0 kHz, in good agreement with the manufactured specifications. A second bending mode 504 at 81 kHz and a third bending mode 506 at 187.9 kHz are also observed. A fundamental torsion mode 508 is detected a frequency of 226.4 kHz, close to the frequency of the third bending mode; and a second torsion mode is detected at a frequency of 631.9 kHz, close to the working bandwidth limit of preamplifier 306.

Figure 6:
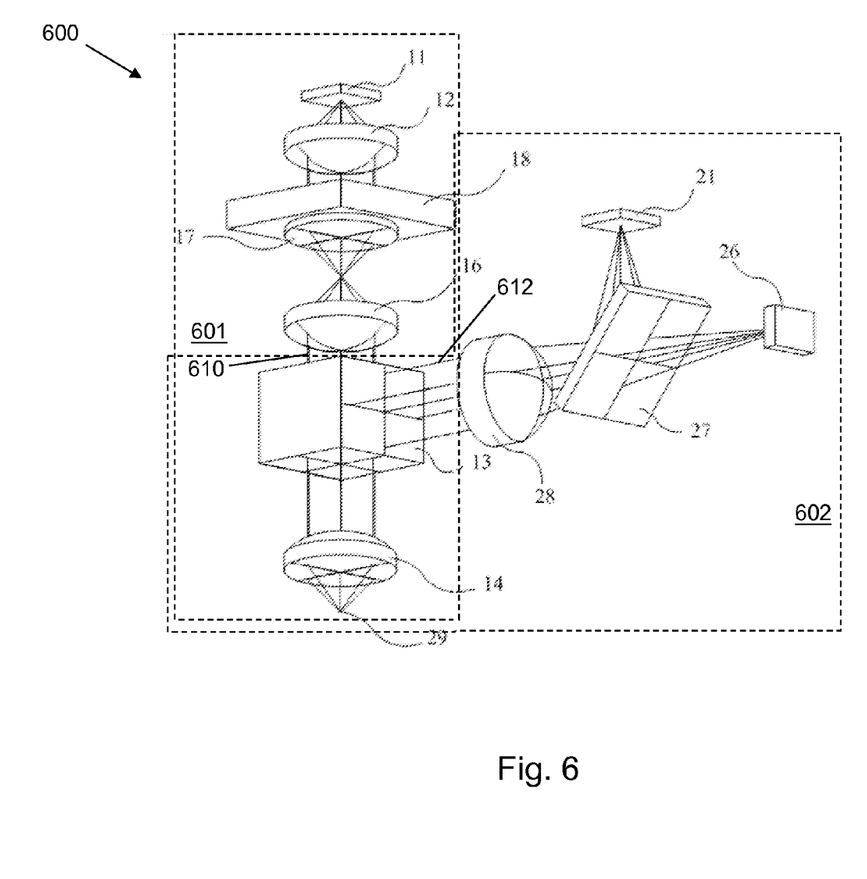
FIG. 6 is a diagram of a third embodiment of an optical path mechanism used with an ADS.

Referring to FIG. 6, a third embodiment of an optical path mechanism 600 combines an optical imaging system 601 and an ADS 602. In this embodiment, light source 21 generates a light beam that is reflected by parallel astigmatic lens 27 through a collimator lens 28 and to objective beam splitter 13. Objective beam splitter 13 reflects the light beam through objective lens 14, which focuses the light beam into detection light spot 29 on the surface of object 3. As in the embodiment described above, objective lens 14 and objective beam splitter 13 are shared by optical imaging system 601 and ADS 602.

Object 3 reflects the incident light back through objective lens 14 and to objective beam splitter 13, which divides the reflected light beam into an imaging light beam 610 and a measurement light beam 612. Imaging light beam 610 is transmitted through objective beam splitter 13, a lens 16, and a relay convex lens 17 mounted on a fine adjustment device 18. Relay lens 17 focuses the imaging light beam into an image spot on image sensor 11. Measurement light beam 612 is reflected by objective beam splitter toward collimator lens 28 and astigmatic lens 27. Astigmatic lens 27 focuses the beam onto PSD assembly 26 for measurement of the displacement of object 3.

As described above, the top surface of sample 3 may be illuminated by an external light source. Light scattered by the surface of object 3 forms an image on image sensor 11. Image sensor 11 thus receives images of both the surface of object 3 and the detection light spot 29 on the surface of object 3. With an actuator attached to either object 3 or objective lens 14, the detection light spot 29 can be positioned at a desired location on the surface of object 3.

Figure 7:
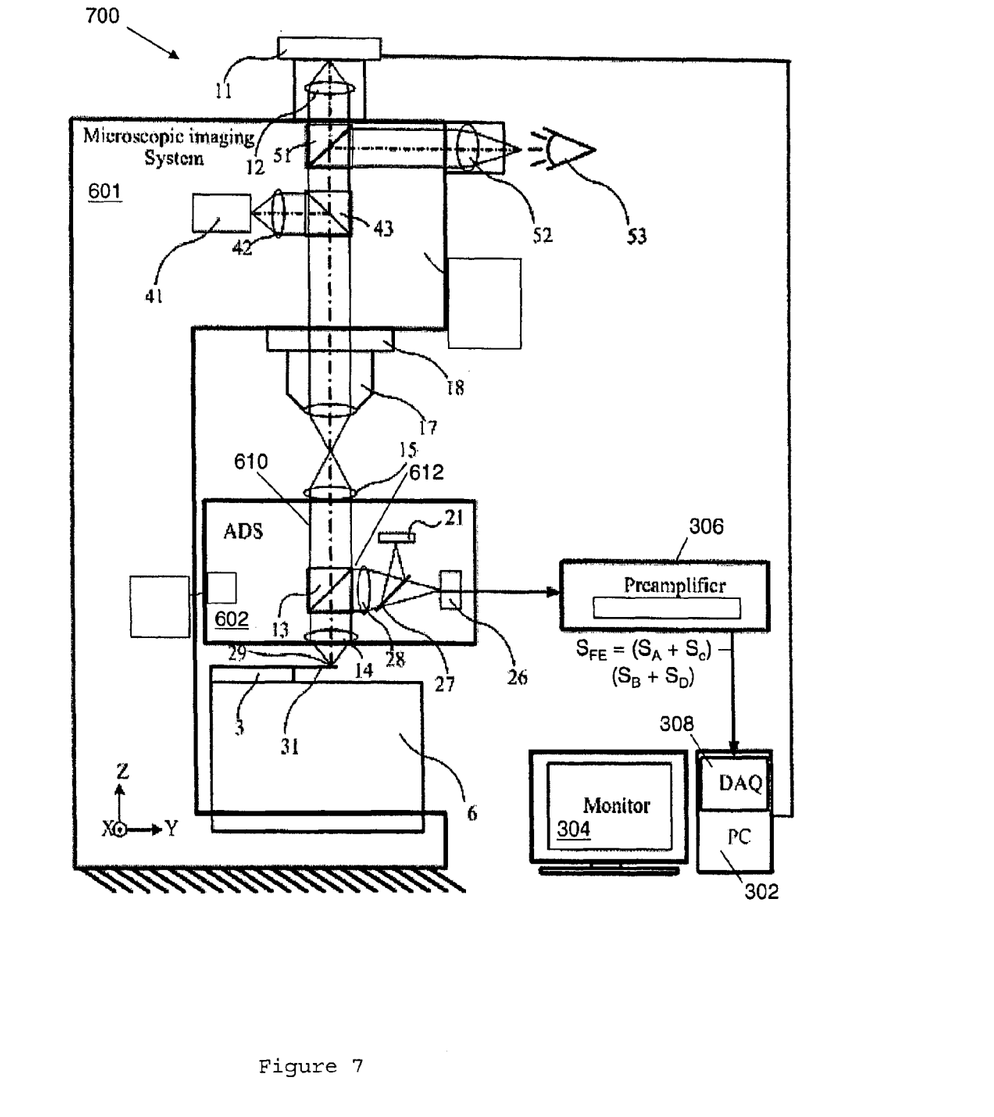
FIG. 7 is a diagram of a measurement system employing the optical path mechanism of FIG. 6.

Referring to FIG. 7, a second embodiment of a measurement system 700 employs optical path mechanism 600 as shown in FIG. 6 for the simultaneous imaging of cantilever 31 and measurement of translational and angular displacements of the cantilever. Detection light spot 29 is focused on cantilever 31, which is also illuminated by external light source 41. The detection light spot 29 is reflected by cantilever 31; the illumination light from external light source 41 is scattered by the surface of cantilever 31. The reflected and scattered light from cantilever 31 passes through objective lens 14 and is transmitted through or reflected by objective beam splitter as described above in conjunction with FIG. 6.

The imaging light beam 610 (i.e., the beam transmitted through objective beam splitter 13) is focused by lens 15 into relay convex 17, from which the beam is directed by imaging beam splitter 51 to CCD imaging sensor 11 and to an eye 53. The position of relay convex 17 is adjustable along the direction of the light beam by fine adjustment device 18. The measurement light beam 612 (i.e., the beam reflected through objective beam splitter 13) passes through the optics of ADS 2 and impinges on PSD 26, from which translational and angular displacements of cantilever 31 are detected and measured.

It is to be understood that the foregoing description is intended to illustrate and not to limit the scope of the invention. For instance, the optical path mechanisms used in conjunction with an ADS for simultaneous imaging and measurement are not limited to those paths described herein. Rather, any configuration of an optical path mechanism that achieves optical imaging and measurement of translational and angular displacement using a single objective lens may be used. Other embodiments are within the scope of the following claims, which claims define the scope of the invention.

What is claimed is:

1. A system for estimating translational and angular displacement of a target object, said system comprising: a laser light source, an objective lens configured to: receive emitted laser light from the laser light source, focus the emitted laser light onto the target object, and receive laser light reflected by the target object; an imaging module configured to receive a first portion of the laser light reflected by the target object; and a measurement module having a photo detector, and an astigmatic lens configured to receive a second portion of the laser light reflected by the target object and to direct the second portion of the laser light onto the photo detector, wherein the measurement module is configured to output, based on information from the photodetector, an estimate of translational and angular displacement of the target object.

2. The system of claim 1, further comprising an objective beam splitter configured to receive the reflected light from the objective lens and to divide the reflected light into the first portion and the second portion.

3. The system of claim 2, wherein the objective beam splitter is further configured to receive the emitted light and to reflect the emitted light into the objective lens.

4. The system of claim 2, further comprising a source beam splitter configured to: receive light emitted by the light source and to reflect the emitted light toward the objective lens; and receive the second portion of the reflected light from the objective beam splitter and to transmit the second portion of the reflected light to the astigmatic lens.

5. The system of claim 1, wherein the astigmatic lens is formed of an inclined glass plate and is further configured to receive the emitted light and to direct the emitted light toward the objective lens.

6. The system of claim 1, wherein the photo detector comprises a position sensitive detector.

7. The system of claim 6, wherein the position sensitive detector comprises a four quadrant position sensitive detector.

8. The system of claim 1, further comprising an illumination light source configured to provide light to the objective lens for illumination of a region of the target object.

9. The system of claim 8, wherein the light provided by the illumination light source is scattered by the target object.

10. The system of claim 9, further comprising an objective beam splitter configured to receive the reflected light and the scattered light from the objective lens and to divide the reflected light and the scattered light into the first portion and the second portion.

11. The system of claim 1, wherein the imaging module includes an imaging sensor.

12. The system of claim 11, wherein the imaging module further comprises a relay lens configured to receive the first portion of the reflected light and to transmit the first portion of the reflected light to the imaging sensor.

13. The system of claim 11, wherein the imaging sensor includes a CCD camera.

14. The system of claim 1, wherein the astigmatic lens comprises a cylindrical lens.

15. The system of claim 1, wherein the astigmatic lens includes an inclined planar light refraction layer.

* * * * *